United States Patent
Phan

(12) 
(10) Patent No.: US 6,597,566 B1
(45) Date of Patent: Jul. 22, 2003

(54) COMPUTER SYSTEM INCLUDING A RISER CARD AND A CHASSIS WITH SERVICEABILITY FEATURES

(75) Inventor: Truong Phan, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/436,771

(22) Filed: Mar. 17, 1999

Related U.S. Application Data

(62) Division of application No. 08/936,858, filed on Sep. 24, 1997, now abandoned.

(51) Int. Cl.[7] ............................................. H01R 12/00
(52) U.S. Cl. ...................... 361/683; 361/759; 248/551; 292/151
(58) Field of Search .................. 361/683–686, 361/724–727, 740, 759; 364/708.1; 248/551–553; 312/216, 218; 70/57–58, 85; 292/42, 148, 151, 307 R

(56) References Cited

U.S. PATENT DOCUMENTS

| | | | |
|---|---|---|---|
| 4,729,614 A | 3/1988 | Nadler et al. | 312/292 |
| 5,199,888 A | 4/1993 | Condra et al. | 439/142 |
| 5,331,506 A | 7/1994 | Nakajima | 361/683 |
| 5,442,514 A | 8/1995 | Hopkins | 361/686 |
| 5,550,709 A * | 8/1996 | Iwasaki | 361/684 |
| 5,673,174 A | 9/1997 | Hamirani | 361/686 |
| 5,722,748 A | 3/1998 | Lajara et al. | 312/265.6 |
| 5,822,190 A * | 10/1998 | Iwasaki | 361/73 |
| 5,963,431 A * | 10/1999 | Stancil | 361/803 |
| 6,046,912 A * | 4/2000 | Leman | 361/784 |
| 6,301,099 B1 * | 10/2001 | Felcman et al. | 361/683 |

* cited by examiner

*Primary Examiner*—Darren Schuberg
*Assistant Examiner*—Hung Van Duong
(74) *Attorney, Agent, or Firm*—Steven D. Yates

(57) ABSTRACT

A computer system is formed using a riser card and a chassis with serviceability features. The riser card includes a connector disposed at an interior facing surface of the riser card for facilitating coupling of a storage device with removable medium to the riser card. The sealed chassis includes a covered opening disposed on a wall of the chassis that can be uncovered to provide access to service one or more components. The riser card in cooperation with the sealed chassis conceals the storage device, if provided. The riser card and the sealed chassis may be independently employed.

15 Claims, 3 Drawing Sheets

COMPUTER SYSTEM INCLUDING A RISER CARD AND A CHASSIS WITH SERVICEABILITY FEATURES

RELATED APPLICATION

This application is a divisional of patent application Ser. No. 08/936,858, filed Sep. 24, 1997 now abandoned.

BACKGROUND OF THE INVENTION

1. Field of the Invention

The present invention relates to the field of computer systems. More specifically, the present invention relates to the serviceability of a computer system.

2. Background Information

Microprocessor based personal computers are known in the art. Conventional microprocessor based personal computers suffer from a number of disadvantages. One of these disadvantages is their high cost of service. In an attempt to reduce the total cost of ownership, sealed chassis are employed for certain embodiments (to prevent users from making "non-standard" hardware modifications to the systems). By sealed chassis, we refer to chassis that require special tools or extraordinary effort to open. As a result, to an ordinary user, the chassis is effectively "sealed". Additionally, no diskette drives are provided (to make it more difficult for users to install "non-standard" software onto the systems). These systems are typically managed remotely through a network, e.g. in a corporate setting. However, the employment of sealed chassis as well the non-provision of diskette drives had made it much more difficult to service/upgrade these systems locally, when the need arises. Thus, a less constraining approach in achieving the reduction of cost of ownership objective is desired.

SUMMARY OF THE INVENTION

A riser card with serviceability features for use to form a computer system is disclosed. The serviceability features include a connector disposed at an interior facing surface of the riser card for facilitating coupling of a storage device that uses removable medium to the riser card. Upon placing the riser card into a system chassis, the connector is concealed.

A computer system formed by using the above disclosed riser card is disclosed. In one embodiment, the removable medium storage device is also included. Similarly, upon placing the riser card into a system chassis, the removable medium storage device is also concealed.

A method for servicing the above disclosed computer system is disclosed. The connector and the storage device, if provided, are exposed. If the storage device is not pre-provided, one is directly connected to the exposed connector. Removable medium with diagnostic software is placed into the storage device. The diagnostic software is then used to service the computer system.

A sealed chassis with serviceability features for use to form a computer system is disclosed. The serviceability features include a covered opening disposed on a wall of the chassis that can be uncovered to provide access to service one or more components.

A computer system formed using the above disclosed chassis is disclosed. The computer system also includes a motherboard having a number of components disposed thereon. Some of the components are located proximately adjacent to the covered opening.

A method for servicing the above disclosed computer system is disclosed. The covered opening is temporally uncovered. The components located proximately adjacent to the opening are serviced. Upon servicing the component(s), the opening is re-covered.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. Those skilled in the art will also appreciate that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Figure 1A:
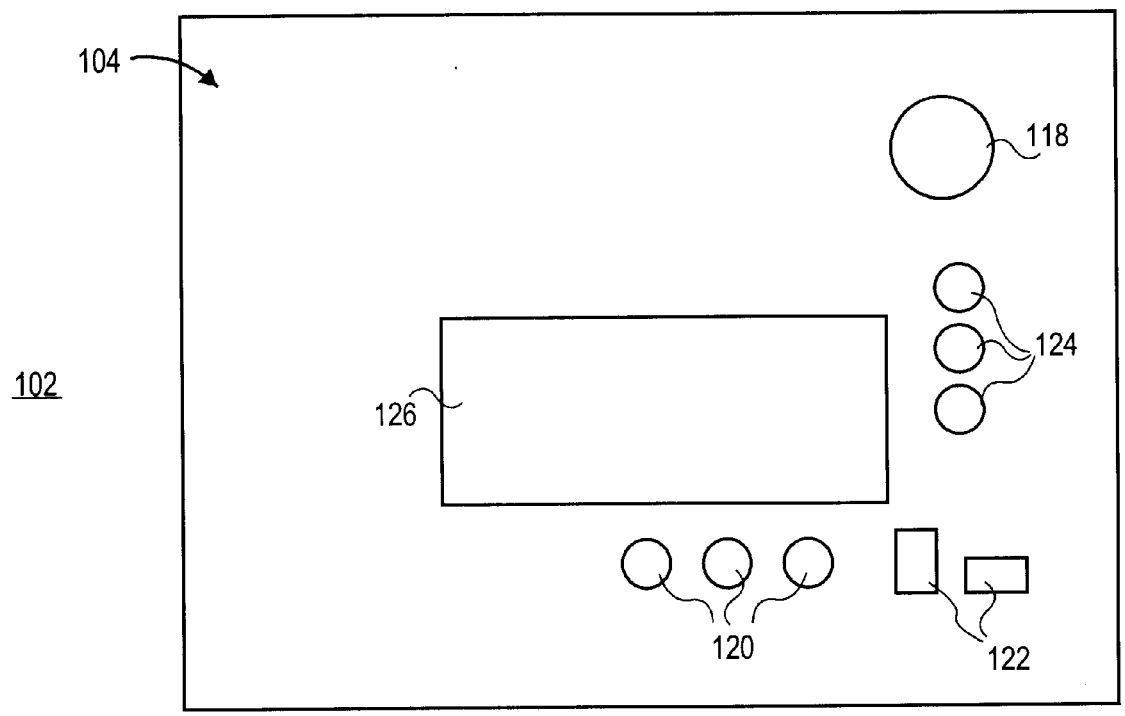
FIGS. 1a–1b illustrate one embodiment of the riser card of the present invention.
Figure 1B:
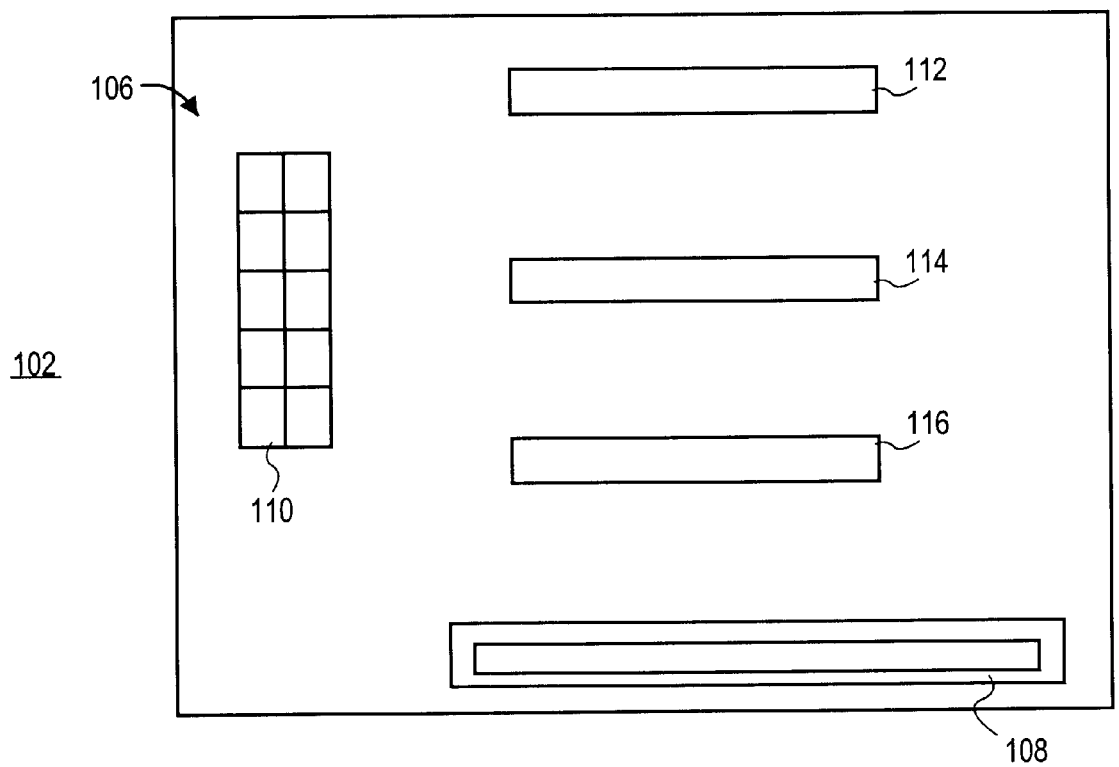

Referring now to FIGS. 1a and 1b, wherein a front and a rear view of one embodiment of the riser card of the present invention is illustrated. As shown, in accordance with the teachings of the present invention, riser card 102 is provided with storage device connector 116 on rear surface 106 of the card body for coupling a storage device that uses removable media to riser card 102. In a preferred embodiment, the storage device is directly connected to riser card 102 by mating storage device connector 116 with a complementary connector of the storage device. An example of a storage device that uses removable media is a diskette drive. Another example of a storage device that uses removable media is a CDROM.

As will be apparent from the description to follow, relative to a system chassis (hereinafter simply chassis), rear surface 106 is an interior facing surface. As a result, connector 116 and the removable medium storage device, if pre-provided, will normally be concealed inside the chassis, unavailable to a user of the host computer system during normal operation, unless the chassis is open. Thus, with riser card 102, a removable medium storage device can be made available for locally servicing the host computer system, but without increasing the risk of a user using the removable medium storage device to load unauthorized modifications to the software of the host computer system, if the chassis is normally sealed. Normally, the host computer system is remotely managed. For the purpose of this application, the host computer system is the computer system "hosting" riser card 102, i.e. any computer system formed using riser card 102.

For the illustrated embodiment, riser card 102 also includes a number of inter-component cabling elimination features 108–126. These features are disposed on front surface 104 as well as rear surface 106 of the card body. Relative to the chassis, the front surface is exterior facing. The features disposed on rear or interior facing surface 106 includes motherboard connector 108 for directly connecting a motherboard to riser card 102 by directly mating with a complementary connector of the motherboard, and a number of other connectors 110–116, including removable medium storage device connector 116, for directly connecting a number of non-add-on card components, including a removable medium storage device, to riser card 102 by mating with complementary connectors of the non-add on card components. Features disposed on front or interior facing surface 104 include power on/off button 118 for facilitating powering on/off the host computer system, I/O ports 120 and 122 for coupling external I/O devices to the host computer system, visual indicators 124 and display area 126 for providing visual indications and display messages respectively to a user of the host computer system. The purpose and usage of these inter-component cabling elimination features is the subject of co-pending U.S. Patent Application, number <to be assigned>, filed contemporaneously, entitled A Computer System Including A Riser Card With Multiple Inter-component Cabling Elimination Features, which is hereby fully incorporated by reference.

Figure 2A:
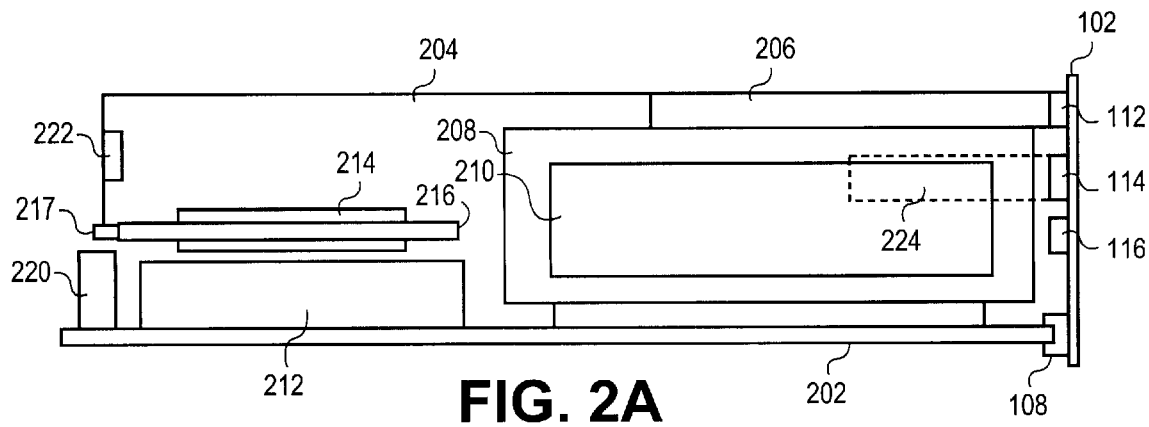
FIGS. 2a–2b illustrate in further detail how the riser card is interconnected to other components of the host computer system.
Figure 2B:
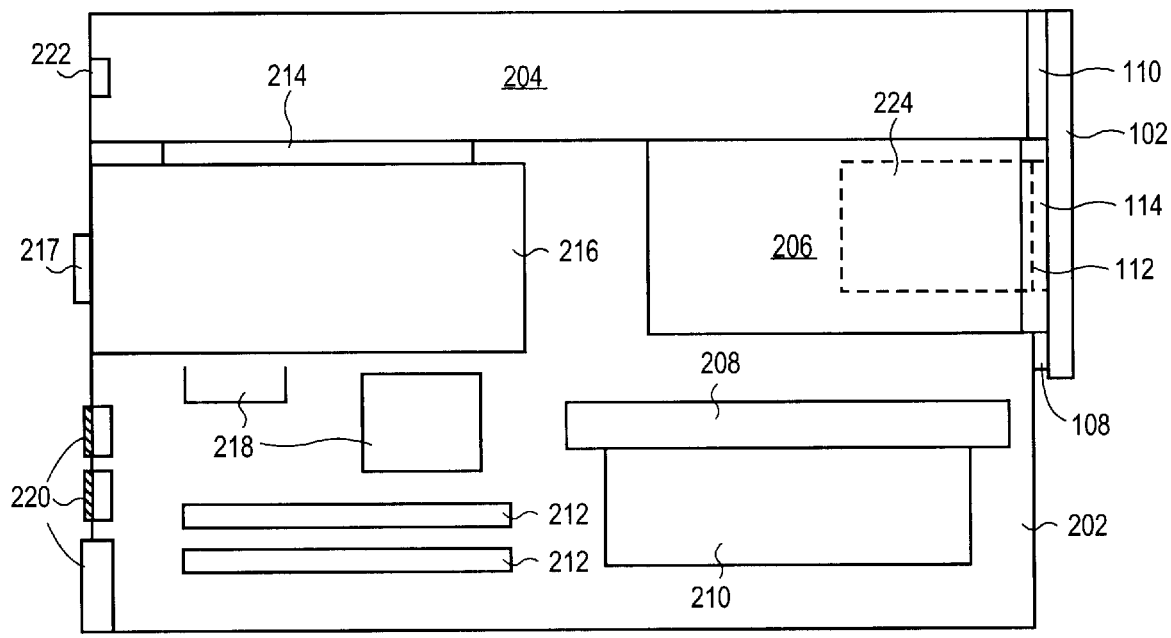

FIGS. 2a and 2b illustrate in further detail how the riser card is interconnected with other components of the host computer system. FIG. 2a is a side view of the interconnected components, whereas FIG. 2b is a top view of the interconnected components. As shown, for the illustrated embodiment, motherboard 202 and riser card 102 are directly connected to each other with motherboard connector 108 mating a complementary connector of motherboard 202. Motherboard 202 includes a number of components attached to it. These components include processor package 208 having heat sink 210 attached to it, and right angle add-on card connector 214 having add-on card 216 attached to it. In one embodiment, add-on card 216 includes network interface 217. Other components include memory modules 212, I/O ports 220 and miscellaneous components 218.

An example of processor package 208 is disclosed in co-pending U.S. patent application, Ser. No. 08/739,815, filed on Oct. 30, 1996, entitled A Processor Card Assembly. Other processor package may also be used. Right angle add-on card connector 214 is the subject of U.S. patent application, number <to be assigned>, filed contemporaneously, entitled A Computer System Including Right Angle Processor and Add-On Card Connectors, which is hereby fully incorporated by reference. An example of add-on card 216 is an add-on card having a Peripheral Component Interconnect (PCI) component. Example of I/O ports 220 are keyboard, mouse, serial and parallel ports. Examples of memory modules are Single In-Line Memory Modules (SIMM) and Dual In-Line Memory Modules (DIMM). Miscellaneous components 218 are intended to represent a broad category integrity circuits such as digital signal processors (DSP) commonly found on motherboards.

Continuing to refer to FIGS. 2a and 2b, in addition to having motherboard 202 directly connected to riser card 102, removable medium storage device 224 is shown directly connected to riser card 102 with storage device connector 116 mating a complementary connector of storage device 224. Removable medium storage device 224 is illustrated with dotted lines to represent the fact that it is not necessary to pre-provide the device. In other words, removable medium storage device 224 may be coupled to storage device connector 116 at service time, when it is needed, after opening the chassis. Removable medium storage device 224 is also illustrated with dotted lines to represent the fact that for the illustrated embodiment, even if provided, it is hidden by fixed drive 206 in the top view, and by processor package 208 in the side view.

Additionally, for the illustrated embodiment, power supply 204 is also directly connected to riser card 102 by mating power supply connector 110 with a complementary connector of power supply 204. Power supply 204 spans the entire length of the motherboard, with receptacle 222 disposed at the opposite end for receiving external A/C power. Fixed drive 206 is also directly connected to riser card 102 by mating fixed drive connector 112 with a complementary connector of fixed drive 206. For a more detailed description, see the above identified incorporated by reference co-pending U.S. Patent Application.

Figure 3:
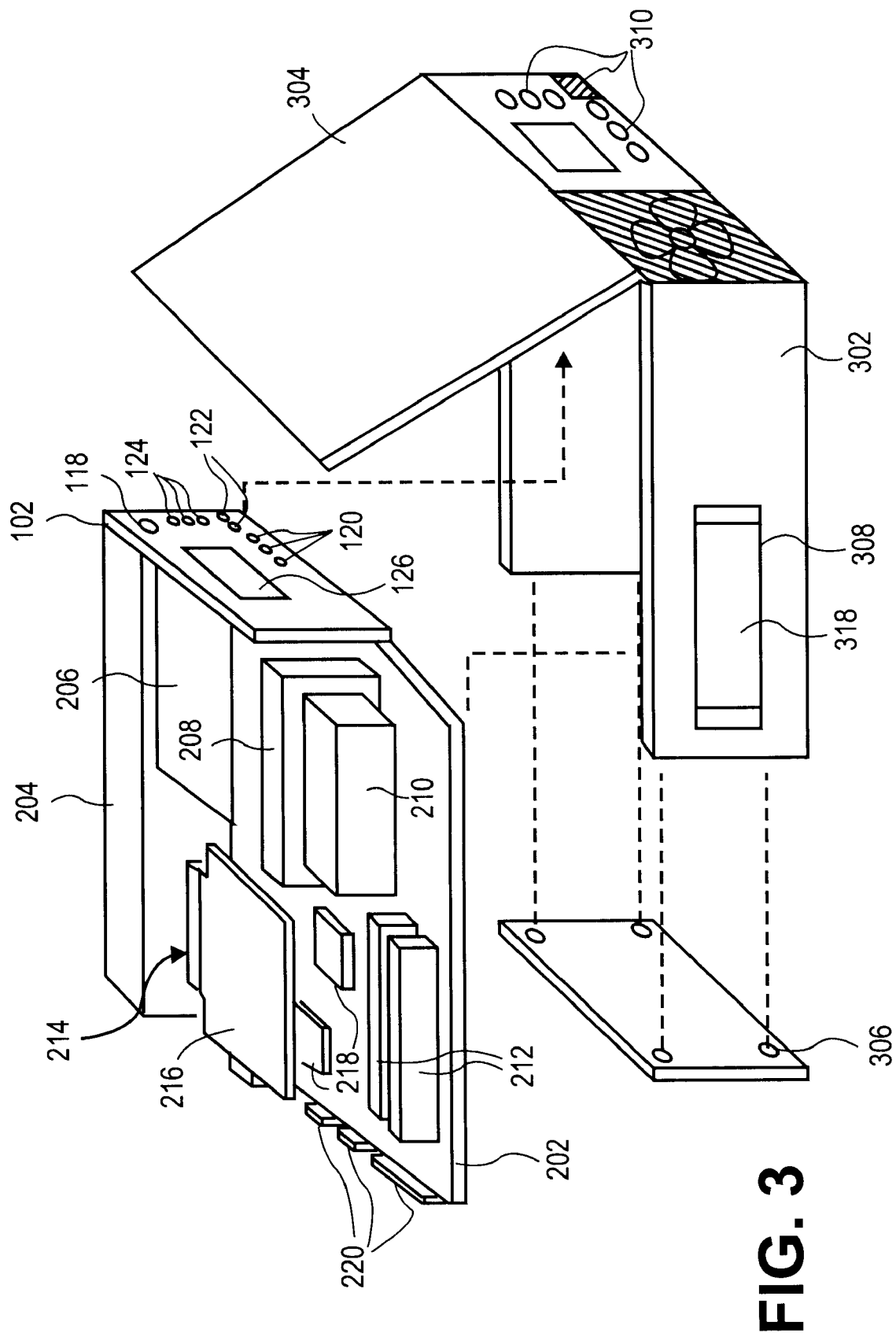
FIG. 3 illustrates in further detail how the riser card and other interconnected components are placed into a chassis to form a computer system in accordance with one embodiment of the present invention.

FIG. 3 illustrates in further detail how the interconnected components are placed into a chassis to form a computer system in accordance with one embodiment of the present invention. As shown, the interconnected components, motherboard 202, riser card 102 etc. are placed into chassis 302 with riser card 102 disposed directly behind the front wall of chassis 302. For the illustrated embodiment, chassis 302 includes hinged cover 304 and back panel 306. which when assembled, render the chassis effectively sealed, and the internal components, including storage device connector 116 and storage device 224, if provided, inaccessible to an ordinary user. An effectively sealed chassis is one that require special tools and/or extraordinary effort to open.

Chassis 302 also includes covered opening 308 for serviceability. For the illustrated embodiment, covered opening 308 includes sliding cover 318. Sliding cover 318 can be slid in one direction to temporally uncovered opening 308 to provide access to service a number of components of the host computer system disposed proximately adjacent to opening 308, such as memory modules 212. Upon servicing these components, opening 308 may be re-covered by returning sliding cover 318 to its original position. In other words, with sealed chassis 302 of the present invention, certain components can be serviced without unsealing chassis 302.

For the illustrated embodiment, front wall of chassis 302 includes corresponding openings 310 for externalizing the features disposed on exterior facing surface 104 of riser card 102, i.e. power on/off button 108, I/O ports 122, indicator lights 124 and display area 126, and back panel 306 includes corresponding openings for exposing I/O connectors 220 and receptacle 222 of full length power supply 204. Again, for a more detailed description, see the above identified incorporated by reference co-pending U.S. Patent Application.

To recap, the computer system formed as described earlier may be serviced locally at times of need, even though during normal operation it is serviced remotely, without increasing the risk of undermining the computer system's manageability. Components disposed proximately adjacent to covered opening 308 may be easily serviced by uncovering the opening, and then upon servicing the components, re-covering the opening, without having to unseal the chassis. In more severe situations, chassis 302 may be unsealed to expose storage device connector 116 and normally concealed removable medium storage device 224. If removable medium storage device 224 is not pre-provided, one can be temporally attached. Removable medium storage device 224 may then be used to load the necessary diagnostic software to analyze and aid in servicing the host computer system.

Upon servicing the host computer system, chassis 302 may be re-sealed to re-conceal storage device connector 116 and removable medium storage device 224, if provided.

Thus, using riser card 102 and chassis 302, a computer system may be formed with significant improvement to system management and stability, as well as serviceability. Those skilled in the art will recognize that such a computer system provides significant reduction in the total cost of ownership of the system. Those skilled in the art will also appreciate that the disclosed invention may be practiced with modifications and alterations within the spirit and scope of the appended claims. Accordingly, the above description is to be regarded as illustrative but not restrictive of the present invention.

Thus, a computer system including a riser card and a chassis with serviceability features has been disclosed.

What is claimed is:

1. A riser card for forming a computer system, the riser card comprising:
   a) a card body having a first surface designed to be interior facing, and a second surface designed to be exterior facing, relative to a chassis of the computer system; and
   b) a first storage device connector disposed on the first interior facing surface, designed to couple a storage device for a removable medium to the riser card at the first interior facing surface, by coupling the first storage device connector with a complementary connector of the storage device, wherein the storage device is concealed within the chassis.

2. The riser card as set forth in claim 1, wherein the storage device is a diskette drive, and the first connector is designed to directly connect the diskette drive to the riser card by mating with the complementary connector of the diskette drive.

3. The riser card as set forth in claim 1, wherein the riser card further comprises one or more of the followings:
   c) a power supply connector disposed on the first interior facing surface, designed to directly connect a power supply to the riser card, by mating with a complementary connector of the power supply; and
   d) a second storage device connector disposed on the first interior facing surface, designed to couple a storage device with fixed medium to the riser card, by mating with a complementary connector of the storage device with fixed medium.

4. A riser card for forming a computer system, the riser card comprising:
   a card body having a first surface designed to be interior facing, and a second surface designed to be exterior facing, relative to a chassis of the computer system; and
   a first storage device connector disposed on the first interior facing surface, designed to couple a storage device for a removable medium to the riser card at the first interior facing surface, by coupling the first storage device connector with a complementary connector of the storage device, wherein the storage device is concealed within the chassis wherein the riser card is designed to be directly disposed behind a front wall of the computer system chassis, and the riser card further comprises one or more of the following:
   c) a power on/off mechanism directly disposed on the second exterior facing surface to facilitate powering the computer system on/off;
   d) an I/O port directly disposed on the second exterior facing surface, designed to couple an external I/O device to the computer system;
   e) an indicator light directly disposed on the second exterior facing surface, designed to provide visual indication to a user; and
   f) a display area directly disposed on the second surface of the card body, designed to provide visual displays for the user;
   the chassis having corresponding openings disposed on the front wall to externalize the included ones of the power on/off mechanism, the I/O port, the visual indicator and the display area.

5. A computer system comprising:
   a) a riser card having a motherboard connector and a first storage device connector disposed on an interior facing surface of the riser card, wherein the storage device connector facilitates coupling of a storage device with removable medium to the riser card;
   b) a motherboard having a riser card connector, directly connected to the riser card with the riser card connector mating with the motherboard connector of the riser card; and
   c) a chassis enclosing the riser card and the motherboard, concealing the storage device with removable medium if provided with the computer system.

6. The computer system as set forth in claim 5, wherein the storage device with removal medium is a diskette drive.

7. The computer system as set forth in claim 5, wherein the riser card further comprises a power supply connector disposed on the interior facing surface; and the computer system further comprises c) a power supply having a complementary power supply connector, directly connected to the riser card, with the complementary power supply connector mating the power supply connector of the riser card.

8. The computer system as set forth in claim 5, wherein the riser card further comprises a second storage device connector disposed on the interior facing surface, and the computer system further comprises c) a storage device with fixed medium having a complementary connector, coupled to the riser card, with the complementary connector of the fixed medium storage device mating with the second storage device connector of the riser card.

9. The computer system as set forth in claim 5, wherein the riser card is designed to directly disposed behind a front wall of the chassis, and the riser card further comprises one or more of followings disposed on the exterior facing surface of the riser card:
   a.1) a power on/off mechanism designed to facilitate powering the computer system on/off;
   a.2) an I/O port designed to couple an external I/O device to the computer system;
   a.3) an indicator light designed to provide visual indication to a user; and
   a.4) a display area designed to provide visual displays for the user.

10. The computer system as set forth in claim 5, wherein the computer system further includes a component coupled to the motherboard, and the chassis is a sealed chassis that includes a covered opening disposed on a wall of the chassis, wherein the covered opening can be temporally uncovered to provide access to service the component.

11. The computer system as set forth in claim 5, wherein the computer system further comprises the storage device with removal medium.

12. The computer system as set forth in claim 7, wherein the power supply spans the computer system from a first end to a second end of the chassis, including a receptacle that receives external AC power at the second end of the chassis.

13. The computer system as set forth in claim 10, wherein the component is a memory module.

14. The computer system as set forth in claim 10, wherein the covered opening is an opening covered by a sliding cover.

15. The computer system as set forth in claim 10, wherein the covered opening is disposed on a side wall of the chassis.

\* \* \* \* \*

UNITED STATES PATENT AND TRADEMARK OFFICE
CERTIFICATE OF CORRECTION

PATENT NO. : 6,597,566 B1
DATED : July 22, 2003
INVENTOR(S) : Phan

It is certified that error appears in the above-identified patent and that said Letters Patent is hereby corrected as shown below:

<u>Column 4,</u>
Line 44, delete "extemalizing" and insert -- externalizing --.

Signed and Sealed this

Thirtieth Day of March, 2004

JON W. DUDAS
*Acting Director of the United States Patent and Trademark Office*